June 7, 1927.
H. W. ATWOOD
HEATING DEVICE
Filed July 13, 1925
1,631,614
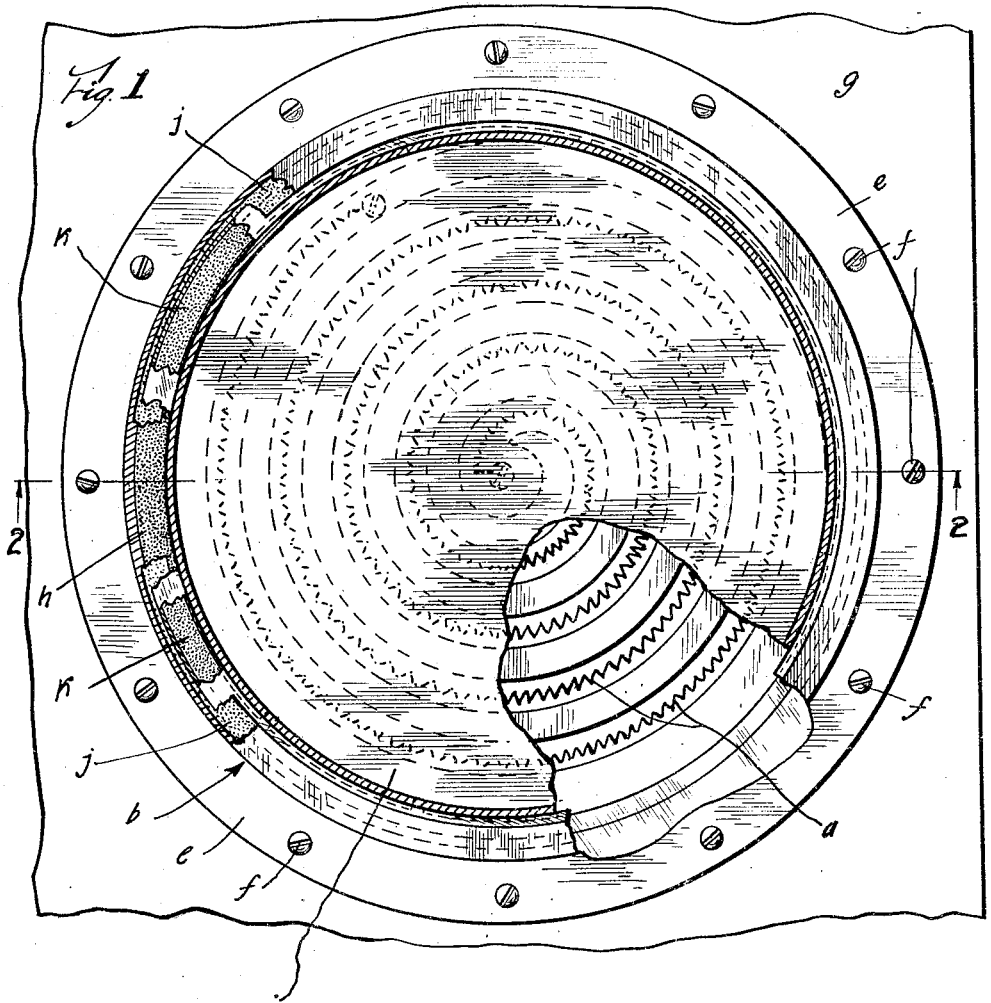
Fig. 1
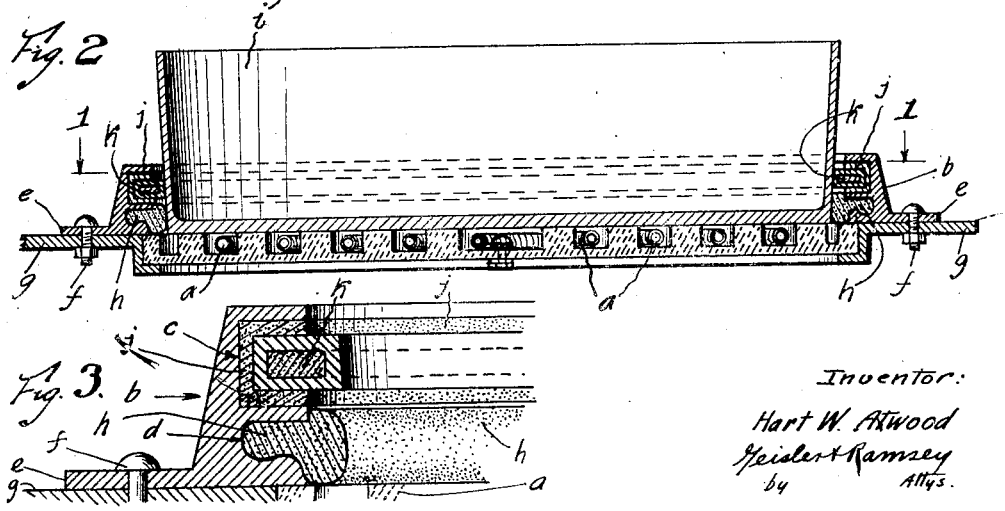
Fig. 2
Fig. 3
Inventor:
Hart W. Atwood
Geisler+Ramsey
by       Attys.

Patented June 7, 1927.

1,631,614

UNITED STATES PATENT OFFICE.

HART W. ATWOOD, OF PORTLAND, OREGON.

HEATING DEVICE.

Application filed July 13, 1925. Serial No. 43,268.

My invention relates to heating elements in which the heat is localized in such a manner that it is applied directly to the utensil and said invention is especially directed to electric plates, and to heating elements in electric ranges.

I have experimented with electric heating elements and have discovered that a large amount of heating energy from the coils is radiated into space and lost instead of being transmitted to the utensil to be heated, and I have discovered that if an insulated housing is placed around said heating element and is provided with an aperture exactly proportioned to receive said utensil, the heat losses can be minimized to such a degree that substantially all of the heat radiated from said coils will be transmitted to the utensil to be heated. Inasmuch as electric energy is measured and paid for by quantity, the saving thus provided may be computed by a direct reduction in the monthly bills paid for electric current.

The object of my invention therefore is to provide devices by which the heating element and the utensil to be heated can be housed in such a manner that the losses will be maintained at a minimum. That is, the object of my invention is to provide a housing for the heating element and for the utensil which fits compactly about both, and which is well insulated so that only a small part of the heat of said element will be lost by radiation from that portion of the heating element not in direct contact with the cooking utensil thereby setting up convection currents which would tend to carry a portion of the heat out into the room.

I attain this object by providing a housing, preferably circular, which corresponds in size to the heating element and which is provided with relatively yieldable insulation so that when a utensil is placed within said ring-like housing the insulation will not only tend to minimize losses by radiation from the portion of the heating element not in direct contact with the utensil but will also tend to prevent loss by convection currents set up in the room.

A further object of my invention is to embody said device in the form of an attachment to a standard range so that said devices can be sold as an article of manufacture and applied to present ranges, the insulation being arranged so that a certain degree of adjustment may be attained to accommodate various utensils.

I illustrate the details of my invention in the accompanying drawings, in which:

Fig. 1 is a plan view of my devices taken on the line 1—1 of Fig. 2, except that a portion of said devices has been broken away to disclose details of construction which would otherwise be concealed.

Fig. 2 is a vertical section taken through the devices on the line 2—2 of Fig. 1; and Fig. 3 is an enlarged fragmentary sectional view through the housing showing details of the insulation therein.

My devices are adapted to be fitted to any heating element, but are especially adapted to be fitted about an electric element $a$. Said elements as now sold conform to relatively fixed standards, such, for example, as six, eight and ten inch elements. Thus, for example, it is necessary to supply a relatively small number of different sized devices to accommodate all of the standard elements. The housings $b$ are preferably integral, ring-like structures provided with two internally arranged circumferential recesses $c$ and $d$ and provided with an outstanding flange $e$ which is fastened to the top of the range about the element. I show bolts $f$ passing through said flange $e$ for holding down said housing to the top of the stove $g$. The recess $d$ is filled with a rope $h$ of insulating material, such for example as asbestos, which is larger than said recess, and thus forms an outstanding ring which bears against the circumference of the utensil $i$ to be heated around its bottom surface and serves as a seal to prevent air from passing from between said heating element and said utensil. In the recess $c$, I provide further insulation $j$ and embedded in said insulation, I provide a hollow, slightly resilient ring $k$, Figs. 2 and 3, adapted to hold the utensil $i$ closely and to protect the said insulation against wear caused by the placing and removing of the said utensil.

As shown in Fig. 2, therefore, the utensil is seated directly on the heating element and is spaced from all metallic or other heat transmitting parts, by insulation, thus minimizing the heat losses due to radiation and conduction and said sections of insulation also produce relatively air tight seals about said heating elements and said utensils to prevent heat losses through convection currents which are set up in the room.

The providing of two heat insulating elements, such for example as $h$ and $j$ spaced apart not only provides a double heat seal, but also provides an air space between the same, as shown in Fig. 2 which is closed by the side of the utensil and thus provides dead air space and effectively prevents radiation of the heat by conduction through the device.

I claim:

1. An attachment for a heating element comprising a ring-like housing adapted to be mounted thereon, having substantial height, the interior diameter of said housing being of such size as to exactly accommodate the utensil to be heated, and heat resisting, resilient insulation included interiorly of said ring-like housing and adapted to form a heat seal with the exterior of said utensil.

2. An attachment for a heating element comprising a ring-like housing adapted to be mounted thereon, having substantial height, the interior diameter of said housing being of such size as to exactly accommodate a utensil to be heated, and a plurality of interiorly arranged circumferential recesses provided in said housing and adapted to receive heat resisting insulation.

3. An attachment for a heating element comprising a ring-like housing adapted to be mounted thereon, having substantial height, the interior diameter of said housing being of such size as to exactly accommodate the utensil to be heated, an interiorly arranged circumferential recess provided in said housing, heat resisting insulating element contained in said recess and extending inwardly therefrom to form a heat seal with the exterior of said utensil.

4. An attachment for a heating element comprising a ring-like housing adapted to be mounted thereon, having substantial height, the interior diameter of said housing being of such size as to exactly accommodate the utensil to be heated, a plurality of interiorly arranged circumferential recesses provided in said housing, heat resisting insulating element contained in said recesses and extending inwardly therefrom to form a heat seal with the exterior of said utensil.

5. An attachment for a heating element comprising a ring-like housing adapted to be mounted thereon, having substantial height, the interior diameter of said housing being of such size as to exactly accommodate the utensil to be heated, a plurality of interiorly arranged circumferential recesses provided in said housing, heat resisting insulating element contained in said recesses and extending inwardly therefrom to form a heat seal with the exterior of said utensil, one of said elements comprising a hollow metal ring securely held spaced from said housing by relatively resilient heat insulating material.

6. In combination with a heating element, a ring-like, heat insulated housing surrounding said element and extending upwardly therefrom provided with an aperture proportioned to receive a utensil, said holder being provided with interiorly arranged resilient heat insulation adapted to form a heat seal with the exterior of the utensil.

HART W. ATWOOD.